Feb. 24, 1953 J. N. WEILAND 2,629,474
FLUID PRESSURE AND SCREW OPERATED COUPLING
Filed April 14, 1950 4 Sheets-Sheet 1

INVENTOR.
JOHN N. WEILAND
BY
Gustav Q. Wolff
ATT

Feb. 24, 1953 J. N. WEILAND 2,629,474
FLUID PRESSURE AND SCREW OPERATED COUPLING
Filed April 14, 1950 4 Sheets-Sheet 3

INVENTOR.
JOHN N. WEILAND
BY
Gustav A. Wolff
ATT.

Feb. 24, 1953 J. N. WEILAND 2,629,474
FLUID PRESSURE AND SCREW OPERATED COUPLING
Filed April 14, 1950 4 Sheets-Sheet 4

INVENTOR.
JOHN N. WEILAND
BY
Gustav A. Wolff
ATT

Patented Feb. 24, 1953

2,629,474

UNITED STATES PATENT OFFICE 2,629,474

FLUID PRESSURE AND SCREW OPERATED COUPLING

John N. Weiland, Cleveland, Ohio

Application April 14, 1950, Serial No. 155,898

9 Claims. (Cl. 192—85)

The present invention relates to a friction type coupling mechanism constructed to operate both as frictional clutch structure adapted to effect frictional driving of a rotary device by a power-driven element, and, as frictional brake structure adapted to effect frictional braking of a driven rotary device, and is particularly suitable as a clutch structure of various types of power-driven machines with continuously driven fly-wheels, in which machines the motion and energy of the fly-wheels is transmitted to the parts to be driven.

The general object of the invention is the provision of a fluid and spring power operated coupling mechanism for power-driven machines, which mechanism embodies pairs of cooperating axially-shiftable friction shoe means, and fluid-operated, pretensioned, spring-actuated pairs of cooperating, axially rotatable shifting means for said pair of cooperating friction shoe means coupled therewith so as to effect simultaneous selective shifting of the individual friction shoe means of each pair in opposite directions with respect to each other and the coupling mechanism.

Another object of the invention is the provision of a fluid and spring power operated coupling mechanism for power driven machines, which mechanism embodies pairs of cooperating, axially-aligned, axially shiftable friction shoe members have flat or level friction surfaces, an axially-rotatable supporting and shifting means for each pair of cooperating friction members mounting and axially shifting such part of friction members in opposite directions with respect to each other, and cooperating fluid operated and spring-actuated means coupled with the axially rotatable supporting and shifting means effecting selective simultaneous shifting of the individual friction shoe members of each pair in opposite directions with respect to each other for coupling and releasing the coupling mechanism.

A further object of the invention is the provision of a fluid and spring power operated coupling mechanism for power driven machines which mechanism embodies pairs of cooperating, axially aligned, axially shiftable individual friction shoe members supported by axially, floatingly mounted, axially rotatable supporting and shifting means with oppositely threaded end portions threadedly engaged with the friction shoe members and effecting selective simultaneous shifting of the friction shoe members in opposite directions with respect to each other when the supporting and shifting means are rotated in one or the other direction by fluid or spring power.

Still another object of the invention is the combination of a fluid and spring power operated coupling mechanism of the type described with a shaft mounting said mechanism and a housing enclosing such mechanism and providing friction surfaces for the friction shoe members of the mechanism enclosed by the housing, in which combination shaft and housing are axially rotatably mounted with respect to each other, and in which the cooperating friction shoe members of each pair of friction shoe members are shifted in opposite directions toward or away from the friction surfaces of the housing when the supporting and shifting means of the coupling mechanism are rotated in one or the other direction by fluid or spring power.

With the above and other incidental objects in view which will appear hereinafter, the invention consists in certain other novel features of construction and combination of parts, the essential elements of which are set forth in the appended claims, and a preferred form of embodiment of the invention is hereinafter shown with reference to the drawings accompanying and forming part of the specification.

Figure 1:
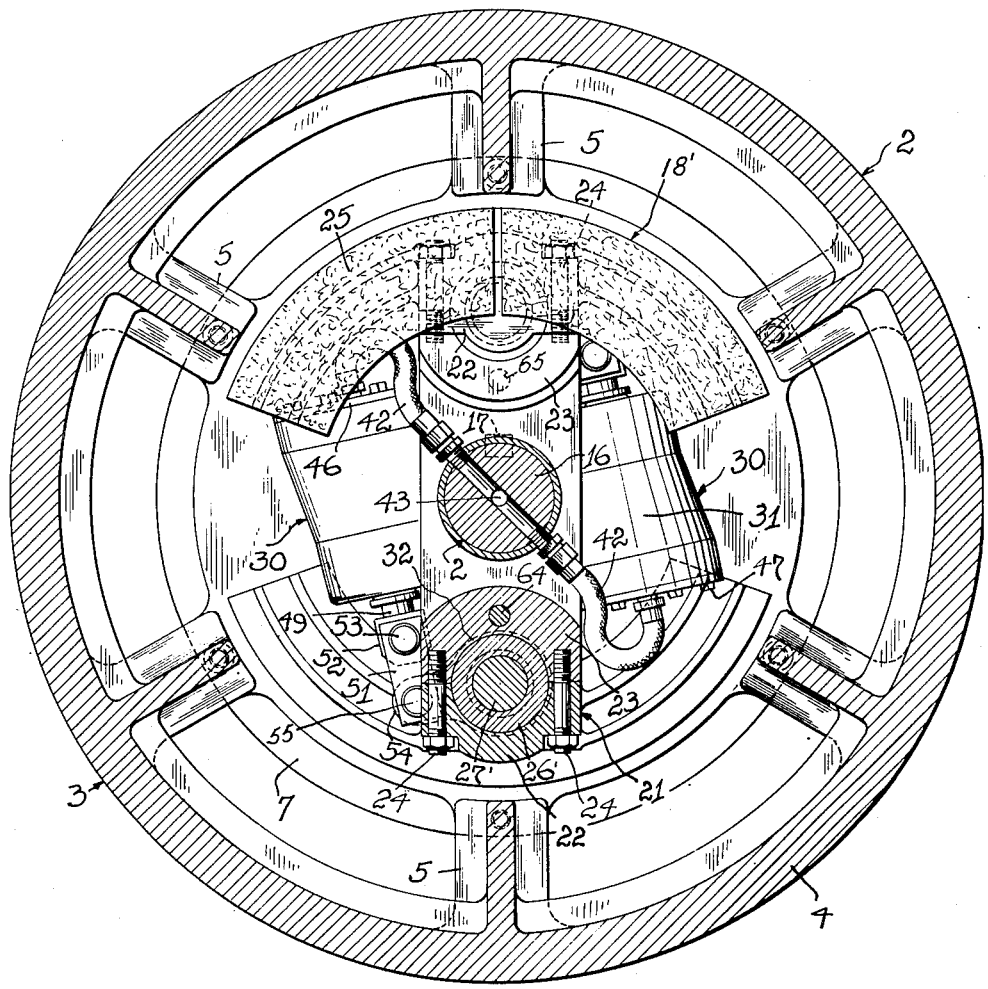
Fig. 1 is a sectional view through a fluid-operated coupling mechanism constructed in accordance with the invention, the mechanism being shown in combination with a wheel-like housing on a shaft journaled in said housing, the section being taken on line 1—1 of Fig. 3, of the drawings.
Figure 2:
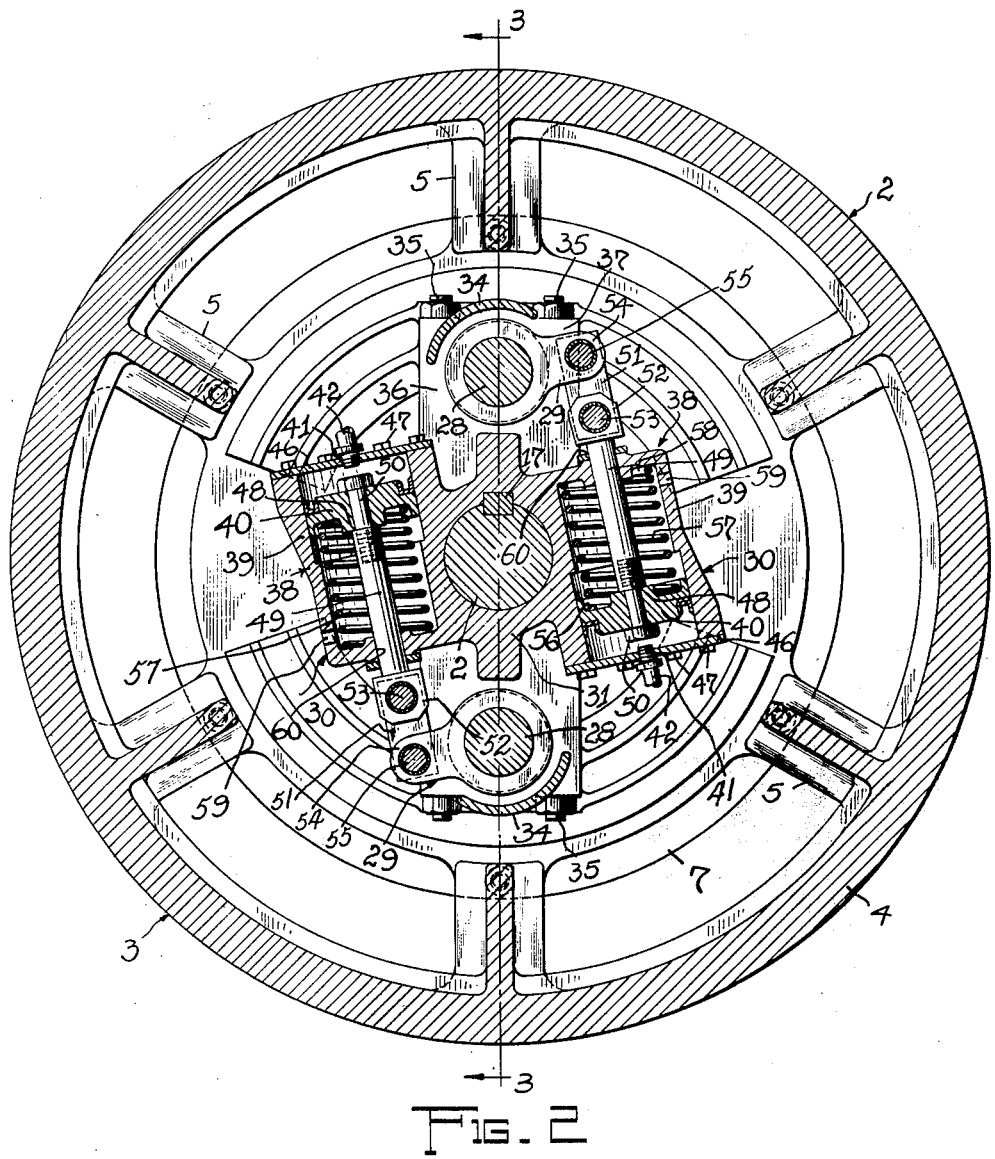
Fig. 2 is a sectional view similar to Fig. 1, the section being taken on line 2—2 of Fig. 1.
Figure 3:
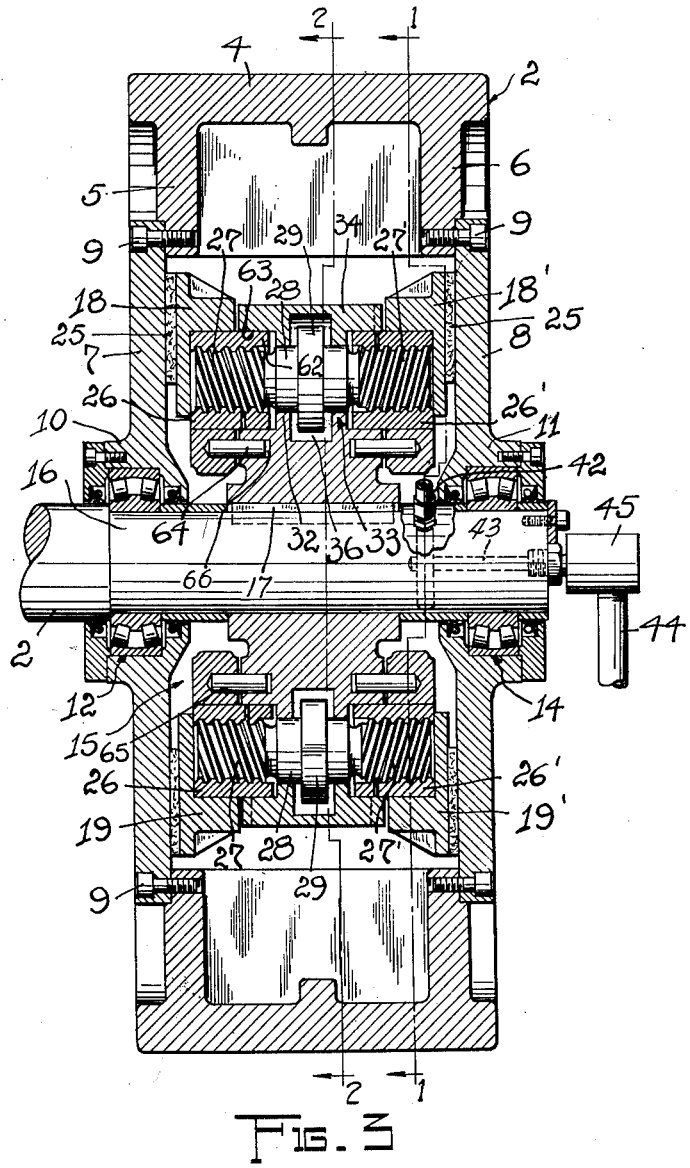
Fig. 3 is a longitudinal sectional view through the fluid operated coupling mechanism shown in Figs. 1 and 2, the section being taken on line 3—3 of Fig. 2.
Figure 4:
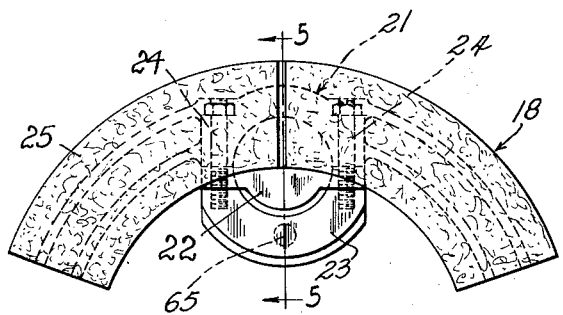
Fig. 4 is a front view of one of the friction shoe members.
Figure 5:
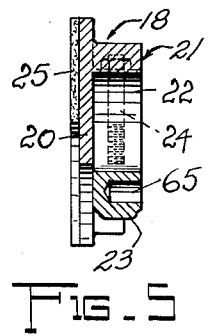
Fig. 5 is a cross-sectional view on line 5—5 of Fig. 4.
Figure 6:
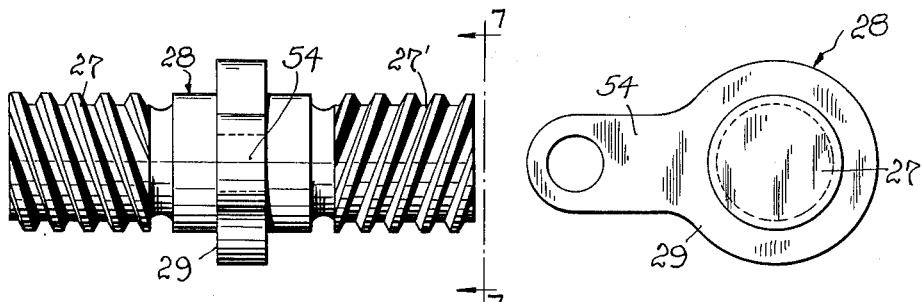
Fig. 6 is a side view of one of the rotary, shoe supporting members.
Figure 7:
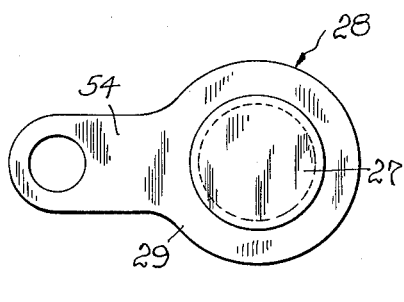
Fig. 7 is an end view of Fig. 6.
Figure 8:
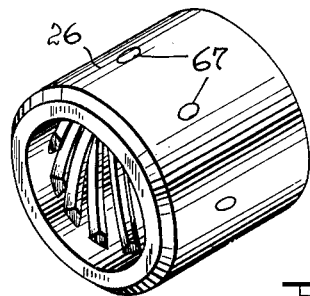
Fig. 8 is a perspective view of one of the nut members which are supported by the friction shoe members and threadedly engaged with the shoe supporting and shifting members.

Referring now more in detail to the exemplified form of the invention shown in the drawings, reference numeral 2 denotes a driven shaft which freely-rotatably mounts a wheel-shaped housing 3. This housing includes a rim portion 4 provided with radial ribs 5 and 6 having attached thereto by means of machine bolts 9 disk members 7 and 8. These disk members are centrally formed with perforated hub portions 10 and 11 freely rotatably mounting by means of roller bearings 12 and 14 driven shaft 2 so that the wheel-shaped housing and driven shaft 2 are freely-rotatably arranged with respect to each other.

Disk members 7 and 8 form friction disks for a coupling mechanism 15 mounted on portion 16 of driven shaft 2, which mechanism is keyed to portion 16 by a key member 17. This coupling mechanism includes two pairs of cooperating, symmetrically arranged friction shoe members 18, 18' and 19, 19', all of which are of identical construction. Each of these friction shoe members consists of a flat plate 20 having the outline of a sector of a ring-shaped disk, which plate has extended from its rear face a clamp-like member 21 including a main portion 22 integrally formed with plate 20 and a clamping yoke 23 secured to main portion 22 by clamping bolts 24. The front face of plate 20 is lined with brake lining 25 to insure the desired coupling action of the friction shoe members as will be later described.

The friction shoe members 18 and 19 support and rigidly hold in their respective clamp-like member 21 a nut member 26 and the friction shoe members 18' and 19' support and rigidly hold in their respective clamp-like member 21 a nut member 26' which nut members couple the shoe members with the left and right-handed threaded end portions 27, 27' respectively, of a supporting and shifting rod 28 formed with a perforated lever arm 29 extended laterally from said rod midway between its opposite ends.

The threads of the nut members 26 and 26' and the corresponding threads of the corresponding left and right-handed threaded end portions 27, 27', respectively, of supporting and shifting rod 28 are of the multiple-thread type to insure proper lead and the required movement of the friction shoe members when the freely and rotatably mounted supporting and shifting rod 28 is rotated in one or the other direction by an actuating mechanism 30 later to be described.

The supporting and shifting rods 28 are rotatably mounted in a base member 31 keyed to shaft 2 by the key member 17. For such purpose base member 31 journals the rods 28, base member 31 forming a pillow 32 of a journal-like structure 33 including a cap 34 secured to the base member by bolt members 35. The journal-like structure 33 is formed in its central portion with an enlarged chamber 36 and a slot 37 extending from said chamber to permit proper engagement of the lever arms 29 of rods 28 with the actuating mechanism 30.

This actuating mechanism embodies for each supporting and shifting rod 28 a cylinder piston device 38 having a cylinder 39 formed as an integral part of base member 31 and a piston 40. Shifting of the piston 40 of the cylinder piston device is effected in one direction by fluid entering the cylinder 39 through a passage 41 in its bottom wall, which passage communicates by a hose member 42 with a bore 43 in shaft 2 and which communicates with a source of fluid under pressure (not shown) by a pipe 44 connected with shaft 2 by a rotary sealing device 45. The cylinder 39 includes a cover-like bottom member 46 secured to base member 31 by bolts 47 and readily removable therefrom for proper access to piston 40 in assembly, disassembly and repair procedures.

The piston 40 is formed with a central boss 48 seating a piston rod 49 which is rigidly secured to the piston by a cap screw 50. This piston rod is coupled by a link 51 with the lever arm 29, the link being pivoted to the yoke-shaped end portion 52 of piston rod 50 by a pin 53 and to the perforated head portion 54 of lever arm 29 by a pin 55. Piston 40, furthermore, is recessed at 56 to form a seat for the one end of a compression spring 57, the other end of which engages a recessed seat 58 formed in cylinder 39. Cylinder 39 includes a discharge opening 59 and a bore 60 aligned with piston rod 49 which extends through said bore.

The nut members 26 and 26' rigidly clamped to the friction shoe members 18, 18' and 19, 19' by the respective clamp-like members 21 and threadedly engaged with the threaded end portions 27, 27' of supporting and shifting rods 28 have their one end portions 62 slidably extended into respective circular recesses 63 of base member 31 to properly guide the friction shoe members when shifted and avoid chattering of those members in clutching and braking operations. In addition the friction shoe members 18, 19 and 18', 19' are prevented from rotation with respect to the base member 31 by dowel-like pins 64 rigidly mounted in bores 65 in the clamping yokes 23 of the clamp-like members 21 and slidably extended into bores 66 in base member 31.

In operation the friction shoe members 18, 19 and 18', 19' are shifted into coupling operation when fluid under pressure through pipe 44, bore 43 and passage 41 enters into cylinders 39 and shifts pistons 40 so as to rotate the supporting and shifting rods 28 in a counterclockwise direction. This rotation effects shifting of the friction shoe members 18, 19 and 18', 19' in opposite directions with respect to each other into engagement with the disk members 7 and 8 and thus effects a frictional coupling engagement of the friction shoe members with the disk members. A release of the pressure fluid which may be automatically effected in any customary manner releases the frictional engagement between the friction shoe members and the disk members, as at the time the fluid under pressure in cylinders 39 is released, the spring pressure of pretensioned coil springs 57 effects rotation of the supporting and shifting rods 28 in a clock-wise direction. Such rotation effects shifting of the friction shoe members in opposite directions with respect to each other, out of engagement with the disk members 7 and 8, and thus releases the frictional engagement of the friction shoe member with the disk members.

A frictional coupling mechanism of the type described is of simple construction and permits quick and efficient assembly and disassembly of the structure. The mechanism, furthermore, can readily and easily be adjusted in case of wear of the lining on the friction shoe members by releasing clamping bolts 24 securing clamping yoke 23 to the main portion 22 of the clamp-like member 21 and rotating the respective nut member by a tool inserted in one of the perforations 67 in such nut member. Such rotation of the nut member effects shifting of the friction shoe member mounting same and permits after tightening of clamping bolts 24 efficient and quick coupling action of the coupling mechanism. Floating mounting of rods 28, as previously described, insures proper cooperating of the friction shoe members of each pair of shoe members even under adverse conditions.

Having thus described my invention, what I claim is:

1. In a fluid actuated coupling mechanism, a drive shaft including laterally spaced bearing portions, a fly wheel including oppositely arranged, laterally spaced side walls mounted with said side walls on said bearing portion of said shaft, a base member on said shaft rigidly secured thereto to extend between the bearing portions thereof to extend between the side walls of said fly wheel, screw members with left and right handed threaded end portions freely rotatably supported by said base member between the side walls of the fly wheel, friction shoes for the opposite ends of the screw members, said friction shoes extending parallel to said side walls and being slidably and non-rotatably coupled with said base member and threadedly engaged with the respective screw members, and fluid operated means on said base member arranged between the side walls of said fly wheel, said fluid operated means including shiftable portions coupled with said screw members for rotating same to effect shifting of the friction shoes into frictional engagement with the side walls of said fly wheel.

2. The combination of a fly wheel embodying a hub portion formed by parallel, laterally spaced side walls with a driven shaft freely rotatably mounting said fly wheel, and fluid operated coupling mechanism rigidly mounted on said shaft between the spaced side walls of said fly wheel, said coupling mechanism including a base member mounted on said shaft, screw members having oppositely threaded end portions and middle portions rotatably mounted in said base member, friction shoes threadedly engaged with the end portions of the screw members and slidably, non-rotatably coupled with the base member, and fluid operated means forming part of said base member and including shiftable portions coupled with the screw members, said fluid-operated means adapted to rotate said screw members to effect shifting of the friction shoes in opposite directions and coupling of the side walls of the fly wheel with a driven shaft.

3. The combination as described in claim 2 wherein the fly wheel embodies a rim portion having said side walls removably attached thereto.

4. The combination as described in claim 2 wherein the screw members have their middle portions axially rotatably and axially floatingly supported in said base member and wherein the screw members have laterally extended from their middle portions lever arms coupled with the fluid operated means.

5. The combination as described in claim 2, wherein the said screw members have their middle portions axially rotatably and axially floatingly supported in said base member, wherein said friction shoes each mount a nut member adjustably secured thereto, wherein said members mounted on said friction shoes are threadedly engaged with the threaded end portions of the respective screw members, and wherein the screw members have laterally extended from their middle portions lever arms extended through slots in said base member outwardly therefrom and coupled with the fluid-operated means.

6. In a fluid-actuated coupling mechanism oppositely arranged spaced walls, a shaft journaled in said walls, a base member mounted on said shaft between said walls, screw members with oppositely threaded end portions axially rotatably and axially floatingly mounted in said base member in symmetrical relation with respect to each other and said shaft, a friction shoe element for each end portion of the screw members threadedly engaged therewith and slidably coupled with the base member, and fluid and spring powered control means coupled with the screw members and adapted to rotate same to effect selective shifting of the friction shoes in opposite directions with respect to each other toward and away from said spaced walls for actuating and releasing said coupling mechanism.

7. A fluid-actuated coupling mechanism as described in claim 6, wherein the fluid and spring power controlled means include fluid operated cylinder piston means embodying shiftable piston means linked to said screw members, cylinder means slidably mounting said piston means, and compression spring means within said cylinder means coaxial therewith and engaged with the piston means, said spring means yieldingly counteracting a shifting of said piston means by fluid under pressure entering said cylinder means.

8. In a fluid-actuated coupling mechanism oppositely arranged spaced walls, a shaft journaled in said walls, a base member mounted on said shaft between said walls, screw members with oppositely threaded end portions axially rotatably and axially floatingly mounted in said base member in symmetrical relation with respect to each other and said shaft, a friction shoe element for each end portion of the screw members threadedly engaged therewith and slidably coupled with the base member, and fluid and spring power controlled means coupled with the screw members and adapted to rotate same to effect selective shifting of the friction shoe elements in opposite directions with respect to each other toward and away from said spaced walls for actuating and releasing said coupling mechanism.

9. A fluid-actuated coupling mechanism as described in claim 8, wherein the fluid and spring power controlled means include fluid-operated cylinder piston means embodying shiftable piston means linked to said screw members, cylinder means slidably mounting said piston means, and compression spring means within said cylinder means coaxial therewith and engaged with the piston means, said spring means yieldingly counteracting shifting of said piston means by fluid under pressure entering said cylinder means.

JOHN N. WEILAND.

REFERENCES CITED

The following references are of record in the file of this patent:

UNITED STATES PATENTS

| Number | Name | Date |
|---|---|---|
| 1,614,976 | Wrenn | Jan. 18, 1927 |
| 1,740,993 | McDonnell | Dec. 24, 1929 |
| 2,045,593 | Frankland | June 30, 1936 |
| 2,426,791 | Ricketts | Sept. 2, 1947 |

FOREIGN PATENTS

| Number | Country | Date |
|---|---|---|
| 7,345 | Austria | Apr. 25, 1902 |
| 299,121 | Great Britain | Oct. 25, 1928 |
| 686,626 | Germany | Jan. 13, 1940 |